Feb. 20, 1940. B. F. FORD 2,191,229
EXTERMINATING APPARATUS
Filed Oct. 11, 1937
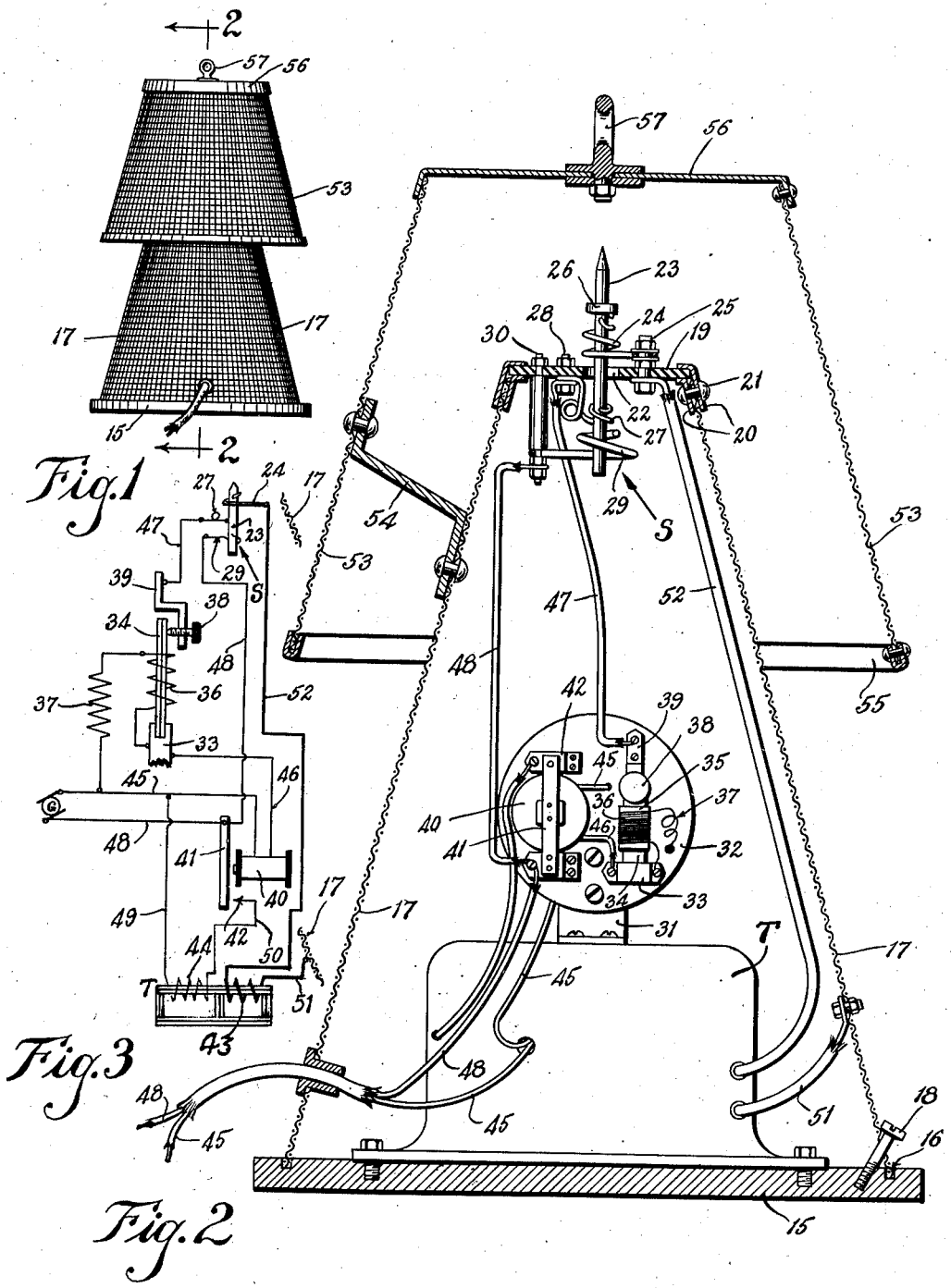
INVENTOR.
Benjamin F. Ford
BY Edwin D. Jones
ATTORNEY.

Patented Feb. 20, 1940

2,191,229

UNITED STATES PATENT OFFICE 2,191,229

EXTERMINATING APPARATUS

Benjamin F. Ford, Los Angeles, Calif., assignor to Electric Traps, Inc., Los Angeles, Calif., a corporation of California Application October 11, 1937, Serial No. 168,324

6 Claims. (Cl. 43—98)

My invention relates to apparatus for exterminating by the process of electrocution, rats and similar rodents or other animals.

It is the purpose of my invention to provide a rat exterminating apparatus which is characterized by being normally de-energized to save current but energizable by the bait-grabbing movements of a rat for a period only sufficient to electrocute the rat, when the apparatus is automatically de-energized and only re-energized by the bait grabbing movements of a succeeding rat.

It is also a purpose of my invention to provide a rat exterminating apparatus as characterized above wherein the relation of its parts is such that a rat, to reach the bait and the point of electrocution, is compelled to climb a support so that once electrocuted and the apparatus de-energized, the rat falls from and clear of the support to make way for a succeeding rat.

In carrying out my invention I provide a rat exterminating apparatus which embodies a transformer, a rat operated control switch for controlling flow of current to the transformer, and a thermostatic switch operable to disrupt current flow to the transformer following closure of the control switch but only after a rat has been electrocuted.

In carrying out my invention I preferably provide a rat exterminating apparatus in which the transformer employed is of the constant current type so that should the control switch remain closed by failure of the rat to fall from the support, the current from the transformer secondary and through the rat as intermittently supplied by the periodic opening and closing of the thermostatic switch, will not rise in an amount sufficient to burn the rat and thus generate a fire, but will remain at a predetermined maximum sufficient only to execute the rat.

With the above and other objects in view, the invention consists in the novel provision, construction, combination and interrelation of parts and features all as so disclosed and claimed.

I will describe only one form of rat exterminating apparatus embodying my invention and will then point out the novel features thereof in claims.

In the accompanying drawing:

Fig. 1 is a view showing in side elevation one form of rat exterminating apparatus embodying my invention.

Fig. 2 is an enlarged vertical sectional view taken on the line 2—2 of Fig. 1.

Fig. 3 is a view showing diagrammatically the electric devices which are embodied in the apparatus and the circuits therefor.

Corresponding parts in all the figures are designated by the same reference characters.

The apparatus in its present embodiment comprises a disk-shaped base 15 having an annular groove 16 in its upper side in which is received the lower edge of a support 17 secured within the groove by one or more screws 18. The support 17 is of a conical form and preferably constructed of heavy wire screen for the dual purpose of giving electrical conductivity thereto and to facilitate climbing by a rat.

The upper end of the support 17 is spanned by a disk 19 of insulating material secured in fixed position by rings 20 through which rivets 21 extend. This disk 19 is formed with a central opening 22 through which extends a contact arm 23. This arm 23 is in the form of a rod of such length as to extend above and below the disk, and it is supported in upright position by a coiled spring 24 in such manner that it is yieldably urged to this upright or perpendicular position. The spring 24 surrounds the rod above the disk with one end secured to the arm and the other end secured to a binding post 25 extending through the disk 19. The upper end of the arm 23 is pointed to receive and hold on the rod any suitable rat bait, downward movement of the bait on the arm being limited by a ring 26 held in fixed position on the arm by the upper end of the spring.

A wire 27 is fixed at one end to the arm 23 and coiled about the same, the other end of the wire being looped and connected to a binding post 28 carried by the disk 19. The purpose of coiling and looping the wire is to allow the necessary lateral movement of the arm and yet maintain an electrical connection between the arm and the binding post.

Surrounding the arm 23 below the wire 27 is a second and relatively heavy contact wire 29. This wire 29 is coiled about but normally spaced from the arm 23 and it is supported in fixed position on the lower end of a binding post 30 depending from the disk 19. In the position of the arm 23 as normally maintained by the spring 24 it is out of contact with the wire 29, but should the arm be moved laterally in any direction against the action of the spring 24, it will engage with the contact wire 29. Thus in effect the arm 23 and the contact wire 29 constitute a control switch S for they form the terminals of a circuit, as will be described hereinafter.

As shown in Fig. 2, a transformer T is bolted to the base 15 within the conical support 17, and on this transformer is secured a bracket 31 carrying a disk 32 of insulating material. Secured to one face of this disk is a thermostatic switch of conventional form which comprises a metal bracket 33 in which is secured metal strips 34 having different coefficients of expansion. Around these strips is a sleeve 35 of insulating material, and wound on the sleeve is a heating coil 36. One end of the coil is connected to the bracket 33 while the other end is connected to a resistance coil 37. As best shown in Fig. 3 the strips 34 normally contact with a setscrew 38 mounted in a metal bracket 39 secured to the disk 32. Also secured to the disk 32 is a relay 40 having an armature 41 normally spaced from a contact 42 but adapted to engage the latter when the relay is energized.

The electrical connections between the various parts of the apparatus will be best understood from a consideration of Fig. 3. As here shown, the circuit for the relay 40 is in parallel with the circuit for the heating coil 36, and both circuits include a generator G or any other suitable source of alternating current. Also, the switch S is included in both circuits so as to control the closing and opening thereof. The circuit for the primary winding 44 of the transformer T embodies the armature 41 and the contact 42. Therefore, this circuit is closed only when the relay 40 is energized. The circuit for the secondary winding 43 of the transformer is adapted to be closed only when the arm 23 and the support 17 are bridged by a rat in the act of grabbing the bait on the arm.

As will be clear from the diagrammatical showing in Figure 3, the transformer T is of the constant current type, that is, a transformer having a magnetic shunt with functions to prevent the current flow in the secondary winding from exceeding a predetermined maximum. In the present instance, this transformer is so designed that the maximum current flow in the secondary winding shall be sufficient to electrocute a rat but insufficient to burn him.

In the operation of the apparatus, a rat seeking the bait on the arm 23 climbs the wire support 17 and in reaching for the bait, the rat not only electrically bridges the support and the arm, but moves the arm laterally to cause it to engage the contact 29. With closing of the switch S the circuit for the relay is completed to cause current from the generator G during any one alternation to flow through the wire 45, winding of relay 40, wire 46, bracket 33, strips 34, screw 38, bracket 39, wire 47, contact arm 23, contact wire 29, and wire 48 back to the generator.

Thus, the relay is energized to move the armature 41 into engagement with the contact 42, thereby completing the circuit for the primary winding 44. Also, with closure of the switch S the circuit for the heating coil 36 is likewise completed, current flowing from wire 45 through resistance 37, coil 36, bracket 33 and strips 34. The remainder of the circuit is readily traceable back to the other side of the generator through the switch S. It will be understood that the resistance 37 is interposed in the circuit of the heating coil to prevent destruction thereof and yet permit heating of the coil to cause flexing of the strips 34 out of engagement with the screw 38 for the purpose of disrupting the circuits for both the heating coil and the relay.

With completion of the circuit for the primary winding 44 the secondary winding 43 becomes inductively energized, thus causing current to flow from one side of the winding through wire 51, support 17, through the body of the rat, contact arm 23, wire 24, and wire 52 back to the other side of the winding.

The voltage of the current induced in the secondary winding is sufficient to effect electrocution of the rat. If for any reason the rat after electrocution should fail to fall from the support 17 or to otherwise disrupt the circuit of the secondary winding, current will cease to flow in this circuit by disrupting the circuit for the primary winding through de-energization of the relay 40. This is effected by the heating of the thermostat to disrupt the connection between the strips 34 and the screw 38 thereby permitting the armature 41 to move out of engagement with the contact 42.

From the foregoing operation, it will be manifest that normally the apparatus is deenergized and that is is only energized to effect electrocution of a rat by the bait-grabbing movements of the rate to operate the switch S and simultaneously bridge the contact arm 23 and the support 17, and that once electrocution of the rat has been effected the apparatus is automatically de-energized to effect cessation of the flow of current therethrough. As the rat falls from the support after electrocution he is clear of the apparatus and hence does not interfere with the electrocution of other rats so that the apparatus is operable continuously to effect the electrocution of rats.

Should a rat not fall from the support but remain in such position thereon as maintain the switch S closed, although the thermostatic switch will periodically disrupt the flow of current through the rat, the transformer T by virtue of its constant current property will not permit the current flow to rise to such a degree as to burn the rat, thus eliminating the possibility of fire.

In Figs. 1 and 2 I have shown the upper portion of the support 17 provided with a guard for the purpose of preventing accidental closing of the switch S and thereby eliminating the possibility of anyone being shocked as a result. This guard comprises a wire cage 53 fixed on the support 17 by one or more brackets 54. The bottom edge of the cage is reinforced by a ring 55, while the upper end of the cage is fixed to and closed by a cap 56 in the center of which is secured an eye 57 which may serve as a handle for carrying the apparatus.

Although I have herein shown and described only one form of rat exterminating apparatus embodying my invention, it is to be understood that various changes and modifications may be made herein without departing from the spirit of my invention and the spirit and scope of the appended claims.

I claim:
1. An exterminating apparatus, comprising; a transformer; a normally open circuit including the secondary of the transformer; a support of conducting material forming one terminal of said secondary circuit; a bait-carrying switch having a contact and an arm yieldably urged out of engagement with the contact and forming the other terminal of the secondary circuit, said switch being insulated from and mounted at an elevated point on the support; a normally open circuit for the primary of the transformer; a source of alternating current in the primary circuit; a normally open second switch in the primary circuit; a control circuit including the current source, a relay for closing the second switch, and the bait-carrying switch, so that when the bait-carrying switch is closed the relay is energized to close the primary circuit; and a normally closed thermostatic switch for opening the control circuit.

2. An exterminating apparatus, comprising; a transformer; a normally open circuit including the secondary of the transformer; a support of conducting material forming one terminal of said secondary circuit; a bait-carrying switch having a contact and an arm yieldably urged out of engagement with the contact and forming the other terminal of the secondary circuit, said switch being insulated from and mounted at an elevated point on the support; a normally open circuit for the primary of the transformer; a source of alternating current in the primary circuit; a normally open second switch in the primary circuit, a control circuit including the current source, a relay for closing the second switch, and the bait-carrying switch, so that when the bait-carrying switch is closed the relay is energized to close the primary circuit; and electro-responsive means for effecting cessation in current flow in the primary circuit a predetermined time after closure thereof to insure that the electrocuted rat will fall from the support.

3. In an electrocuting apparatus; a wire support of conducting material; a member of insulation on the upper end of the support; and a bait switch mounted on the member and comprising a contact arm, a contact, and means for supporting the contact arm on the member so that the arm is urged out of engagement with the contact but can be moved into engagement with the contact by the bait-grabbing movements of an animal.

4. In an electrocuting apparatus; a substantially circular support of conducting material; a substantially circular member of insulating material on the upper end of the support; and a bait switch mounted on the member and comprising a contact, and a bait holding contact arm mounted for pivotal movement in any direction about a transverse axis to engage the contact under the bait grabbing movements of an animal; and means for yieldably urging said arm to a position in which it is out of engagement with the contact.

5. An animal electrocuting apparatus, comprising; a vertical support of conducting material adapted for climbing by an animal; a circuit closer subject to animal actuation and situated at the top of the support; a primary circuit including a source of current, the primary of a transformer, a relay for controlling current flow to said primary, a thermostatic switch for controlling current flow to the relay, said circuit closer controlling current flow to said relay and switch; and a secondary circuit including the support, the secondary of the transformer, and the circuit closer.

6. An animal electrocuting apparatus, comprising; a support of conducting material; a circuit closer mounted on and insulated from said support and subject to animal actuation; a primary circuit including a source of current, the primary of a transformer, a relay for controlling current flow to said primary, a thermostatic switch for controlling current flow to the relay, said circuit closer controlling current flow to said relay and switch; and a secondary circuit including the support, the secondary of the transformer, and the circuit closer.

BENJAMIN F. FORD.